United States Patent [19]

John, Jr. et al.

[11] Patent Number: 4,859,276

[45] Date of Patent: Aug. 22, 1989

[54] TUBE FLUSH ETCHING, RINSING, DRYING, INSPECTING AND PLUGGING SUBSYSTEM AND METHOD IN A TUBE MANUFACTURING SYSTEM

[75] Inventors: Clarence D. John, Jr., Penn Hills Twp, Allegheny County; Francis C. McNerney, Murrysville; Thomas M. Sanders, Unity Twp., Westmoreland County, all of Pa.

[73] Assignee: Westinghouse Electric Corp., Pittsburgh, Pa.

[21] Appl. No.: 81,087

[22] Filed: Aug. 3, 1987

[51] Int. Cl.⁴ ............................ B08B 9/02; C23G 3/04
[52] U.S. Cl. .................................... 156/626; 156/625; 156/651; 156/664; 134/22.11; 134/22.12; 134/96; 134/168 R; 15/306 B
[58] Field of Search ............... 134/22.11, 22.12, 22.13, 134/22.14, 22.15, 96, 168 R, 168 L, 169 R, 169 L, 171; 15/302, 304, 306 B; 156/625, 626, 642, 651, 664

[56] References Cited

U.S. PATENT DOCUMENTS

| | | | |
|---|---|---|---|
| 3,051,061 | 8/1962 | Baxter et al. | 428/213 |
| 3,156,248 | 11/1964 | Rand | 134/60 |
| 3,173,318 | 3/1965 | Lindemann | 82/47 |
| 3,447,074 | 5/1969 | Sower et al. | 324/261 |
| 3,743,124 | 7/1973 | Jarvis | 177/210 R |
| 3,850,692 | 11/1974 | Van Allman et al. | 134/22.12 X |
| 4,382,465 | 5/1983 | Baron et al. | 134/169 C |
| 4,392,506 | 7/1983 | Tanaka et al. | 134/46 |
| 4,522,276 | 6/1985 | Fogg et al. | 177/145 |

FOREIGN PATENT DOCUMENTS 60-67896  4/1985  Japan ............................. 134/22.11

*Primary Examiner*—David L. Lacey
*Assistant Examiner*—Andrew J. Anderson

[57] ABSTRACT

In a fuel rod tube manufacturing system, a tube processing subsystem and method include the steps of arraying, flush etching and rinsing, drying, inspecting and plugging groups of the tubes. At an inlet stage, the tubes are dispensed one at a time from a bundle thereof numbering in the hundreds of such tubes. The dispensed tubes are arrayed in a side-by-side relationship at an assembling stage into a group thereof numbering in the fives of such tubes. Successive groups of the arrayed tubes are delivered to succeeding etch and rinse, drier, and inspection stations where the groups of arrayed tubes are respectively flush etched and rinsed, dried, and inspected. After inspection, accepted tubes are separated from rejected ones and conveyed one at a time to a plug stage where the tubes are plugged to seal the interiors thereof.

9 Claims, 3 Drawing Sheets

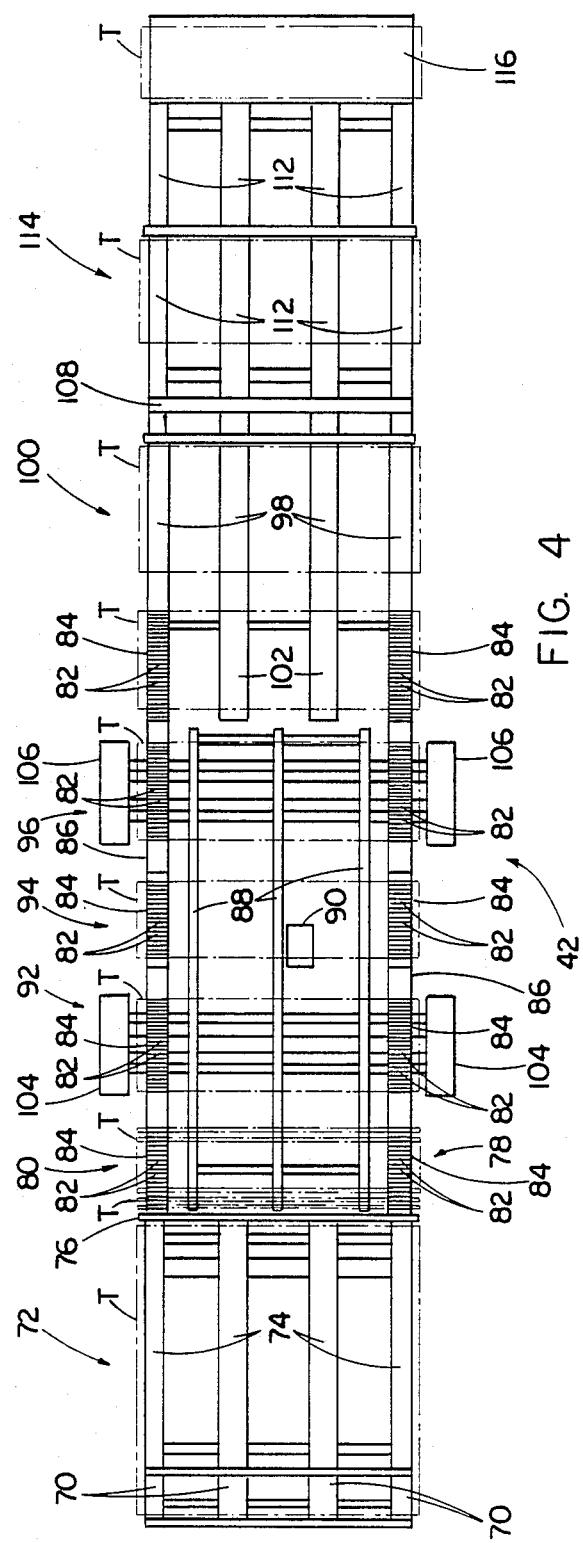
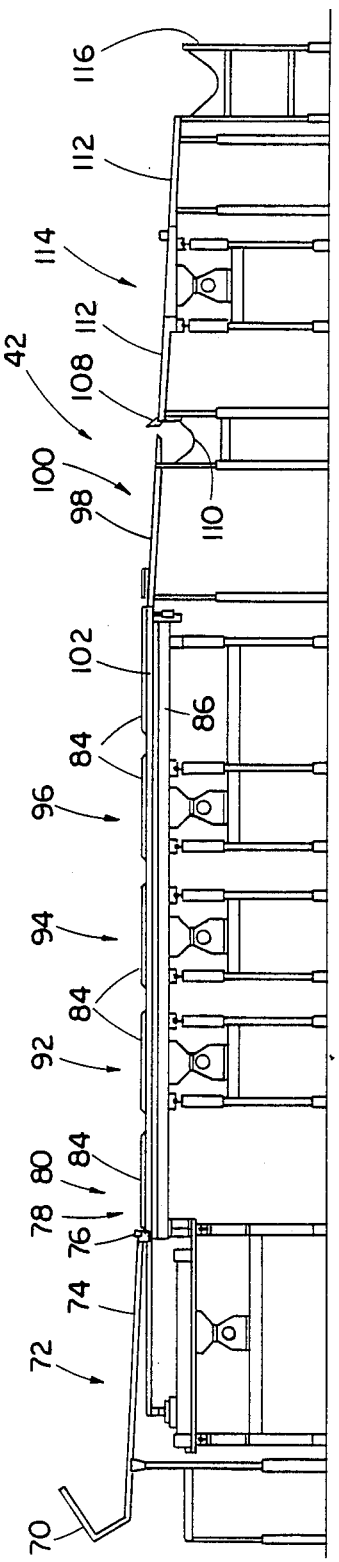
FIG. 4
FIG. 3

TUBE FLUSH ETCHING, RINSING, DRYING, INSPECTING AND PLUGGING SUBSYSTEM AND METHOD IN A TUBE MANUFACTURING SYSTEM

CROSS REFERENCE TO RELATED APPLICATION

Reference is hereby made to the following copending application dealing with related subject matter and assigned to the assignee of the present invention: "Tube Flush Etching, Rinsing And Drying Apparatus And Method" by Clarence D. John, Jr. et al, assigned U.S. Ser. No. 078,487 and filed July 27, 1987 (W.E. 53,794)

BACKGROUND OF THE INVENTION

1. Field of the Invention

The present invention relates generally to the manufacture of metal tubes for use in nuclear fuel rods and, more particularly, is concerned with an automated flush etching, rinsing, drying, inspecting and plugging subsystem and method in a fuel tube manufacturing system.

2. Description of the Prior Art

Because of their critical roles in nuclear reactors, tubes used in fuel rods must meet very stringent quality control standards. Therefore, after formation by multiple pilgering passes, the tubes are subjected to a variety of processing steps including annealing, etching, rinsing, drying, carbide grit blasting, polishing, cleaning and inspecting of the tubes. As practiced heretofore, tube etching, rinsing and drying were carried out on a batch basis meaning that the tubes in lot size bundles, usually six hundred tubes to a bundle (or, in some instances, a half lot size bundle of three hundred tubes) were successively etched, rinsed and dried.

FIG. 1 illustrates a typical prior art tube processing subsystem 10 in a fuel rod tube manufacturing system. To carry out batch etching, as per block 12, a bundle of previously annealed tubes is placed in a carrier with spacers between the tubes. The loaded carrier is transported by a crane to an etching station where it is dipped into an open-top etching tank. Since the opposite ends of the tubes are open, both the inside and outside diameter surfaces of the tubes are etched. To determine whether sufficient material has been removed from the inside and outside tube surfaces by the etching, the entire bundle of tubes must be withdrawn from the etching tank one or more times, inspected by an operator, as per block 14, and then returned to the tank after each withdrawal if more etching is required. Each withdrawal of the bundle from the etching tank exposes the tubes to atmospheric oxygen.

After completion of tube etching, rinsing of the tubes is carried out, as per block 16. The crane transfers the carrier loaded with etched tubes to a rinsing station. At the rinsing station, the bundle of tubes and carrier are lowered into a water tank and the etched tubes rinsed to neutralize any acid residue. The rinsed bundle or tubes is then removed from the water tank and next hosed down while suspended over a drain. The carrier loaded with the rinsed bundle of tubes is then transferred to a drying station, as per block 18, where it is lowered into a forced air chamber. The chamber is closed and a blower and heaters are turned on to force hot air over the bundle to dry the same.

One of the steps following drying of the tubes is ultrasonically testing the tubes for defects, as per block 20. For such testing to be effective, the surfaces of the tubes must be clean and the outside tube surface must be placed in continuous contact with water while the inside of the tube is maintained dry. Since a fluoride layer is now adhered to the tube surfaces due to the performance of etching in the presence of atmospheric oxygen, tube surface cleaning is typically carried out by blasting the surfaces with silicon carbide particles, as per block 22. Then, before ultrasonic testing, the opposite ends of the tubes are sealed by inserting plugs therein, as per block 24. However, before sealing, the tubes are cut to desired length, as per block 26; their outside diameter surfaces are polished or ground, as per block 28; and the surfaces cleaned to remove debris from the cutting and grinding operations, as per block 30. In-process inspections, as per blocks 32-36, accompany each of these steps. Also, immediately before insertion of plugs to seal the tube ends, an inside diameter and straightness inspection is carried out, as per block 38. Then, following completion of ultrasonic testing inspection, the plugs are removed from the ends of the tubes, as per block 40.

In recent times, to improve manufacturing productivity and quality much emphasis has been placed on automation of fuel rod tube manufacture. However, certain aspects of the above-described steps in the conventional tube processing subsystem have tended to constrain such improvements. One aspect is the large number of tubes in each bundle. In processing such a great quantity of tubes concurrently through etching, rinsing and drying, it is cumbersome and time-consuming to have to transport the bundle from one station to the next, and it is difficult to precisely control the quality of individual tubes without substantial manual handling and tube rework being required. Another aspect is etching of the tubes in the presence of atmospheric oxygen. This step has created the problem of fluoride deposits which makes it necessary to introduce extra steps just to rectify this problem. Still another aspect is that cutting the tubes to length before carrying out ultrasonic testing thereof makes it impossible to inspect the tubes completely out to their opposite end edges since the testing equipment recognizes the tube end edges as defects. Thus, the ultrasonic testing equipment must be turned off while the edges pass the sensor which leaves the opposite end portions of the tubes uninspected.

Consequently, a need has evolved for a different approach to certain tube processing steps in fuel rod tube manufacture which promises increased manufacturing efficiency and productivity and improved product quality and reliability.

SUMMARY OF THE INVENTION

The present invention provides a fuel rod tube processing subsystem and method designed to satisfy the aforementioned needs. The subsystem of the present invention is an automated portion of a fuel rod tube manufacturing system. The subsystem operates on tubes divided from the large lot of tubes into much smaller groups and performs the processing steps at a single station. The number of tubes in the smaller groups are only a fraction of their original number, for instance twenty or less tubes which is approximately one-thirtieth or less than the size of the total bundle.

The small groups of tubes are conveyed successively through processing steps which tend to improve the efficiency of tube production. The processing steps of the subsystem specifically involve successive flush etching, rinsing, drying, inspecting and plugging of the tube interiors which are carried out at the single station in a multi-staged processing line. The transporting of a bundle of tubes between individual ones of the processing steps at separate stations as done heretofore is eliminated. The much smaller number of tubes in each group makes it easier to control and improve the quality of individual tubes, reducing the time and labor lost to reworking substandard ones.

Since in the subsystem and method of the present invention only the inside surfaces of the tubes are subjected to acid during flush etching, less material is removed from the tubes. Also, since flush etching and then rinsing are carried out while the ends of the tubes are closed, there is no exposure of the inside tube surface at the same time to both acid and atmospheric oxygen and so no corrective steps need to be taken subsequently as was necessary heretofore to counteract the problems caused by etching in the presence of oxygen.

Further, it has been recognized that it would be advantageous to cut the tubes to the desired length after performance of the ultrasonic inspection. The end portions of the uncut tubes which cannot be inspected by the testing equipment will likely constitute a substantial proportion of the tube ends which are severed during cutting of the tube to exact length. Therefore, any remaining uninspected part of the cut tubes is likely to be so small in size that it will be unlikely to contain defects that could cause a problem later.

Accordingly, the present invention is directed to a tube processing subsystem and method useful in a fuel rod tube manufacturing system. The tube processing subsystem and method include the operative steps of: (a) dispensing fuel rod tubes at an inlet stage one at a time from a bundle thereof; (b) receiving the dispensed tubes one at a time from the inlet stage and arraying the tubes in a side-by-side relationship at an assembling stage into a group thereof smaller in number than the number thereof contained in the bundle; (c) receiving a group of arrayed tubes at an etch and rinse stage and flush etching and rinsing the tubes; (d) receiving a group of etched and rinsed tube at a drier stage and drying the tubes; (e) receiving a group of dried tubes at an inspection stage and inspecting the tubes; and (f) separating those of the inspected tubes which are accepted from those which are rejected.

Still further, the subsystem and method include the additional operative steps of: (g) receiving the accepted inspected tubes one at a time at a plug stage and plugging the tubes to seal the interiors of the tubes; (h) delivering successive groups of arrayed tubes simultaneously from the assembling stage to the etch and rinse stage, from the etch and rinse stage to the drier stage, and from the drier stage to the inspection stage; and (i) conveying the accepted inspected tubes one at a time from the inspection stage to the plug stage.

More particularly, the etching and rinsing of the group of arrayed tubes effectuates flush etching and rinsing of only the interiors of the tubes. Additionally, the etching and rinsing of the group of arrayed tubes effectuates, first, flush etching of the interiors of the tubes from the same one ends toward the same opposite ends thereof, second, rinsing the interiors of the tubes from the same one ends toward the same opposite ends thereof, third, flush etching the interiors of the tubes from the same opposite ends toward the same one ends thereof, and, fourth, rinsing the interiors of the tubes from the opposite ends toward the same one ends thereof.

These and other advantages and attainments of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which:

FIG. 3 is a detailed elevational view, in a somewhat simplified form, of the equipment involved in the tube processing subsystem of the present invention.

FIG. 4 is a top plan view of the equipment of FIG. 3.

DETAILED DESCRIPTION OF THE INVENTION

Figure 1:
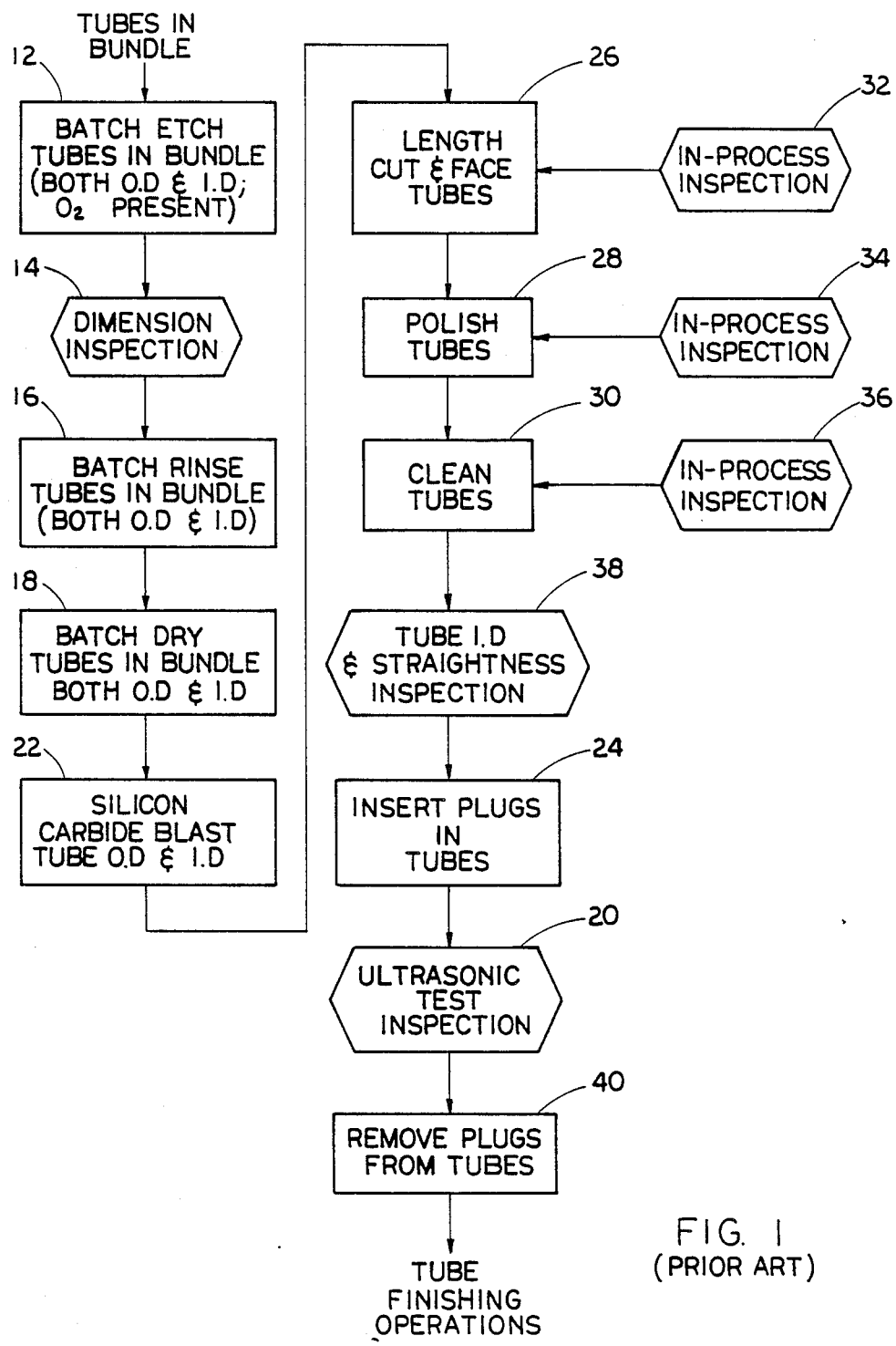
FIG. 1 is a block diagram of the sequence of steps making up the prior art tube processing subsystem used in a fuel rod tube manufacturing system, which subsystem was described earlier in the background section herein.

In the following description, like reference characters designate like or corresponding parts throughout the several views. Also in the following description, it is to be understood that such terms as "forward", "rearward", "left", "right", "upwardly", "downwardly", and the like, are words of convenience and are not to be construed as limiting terms.

Figure 2:
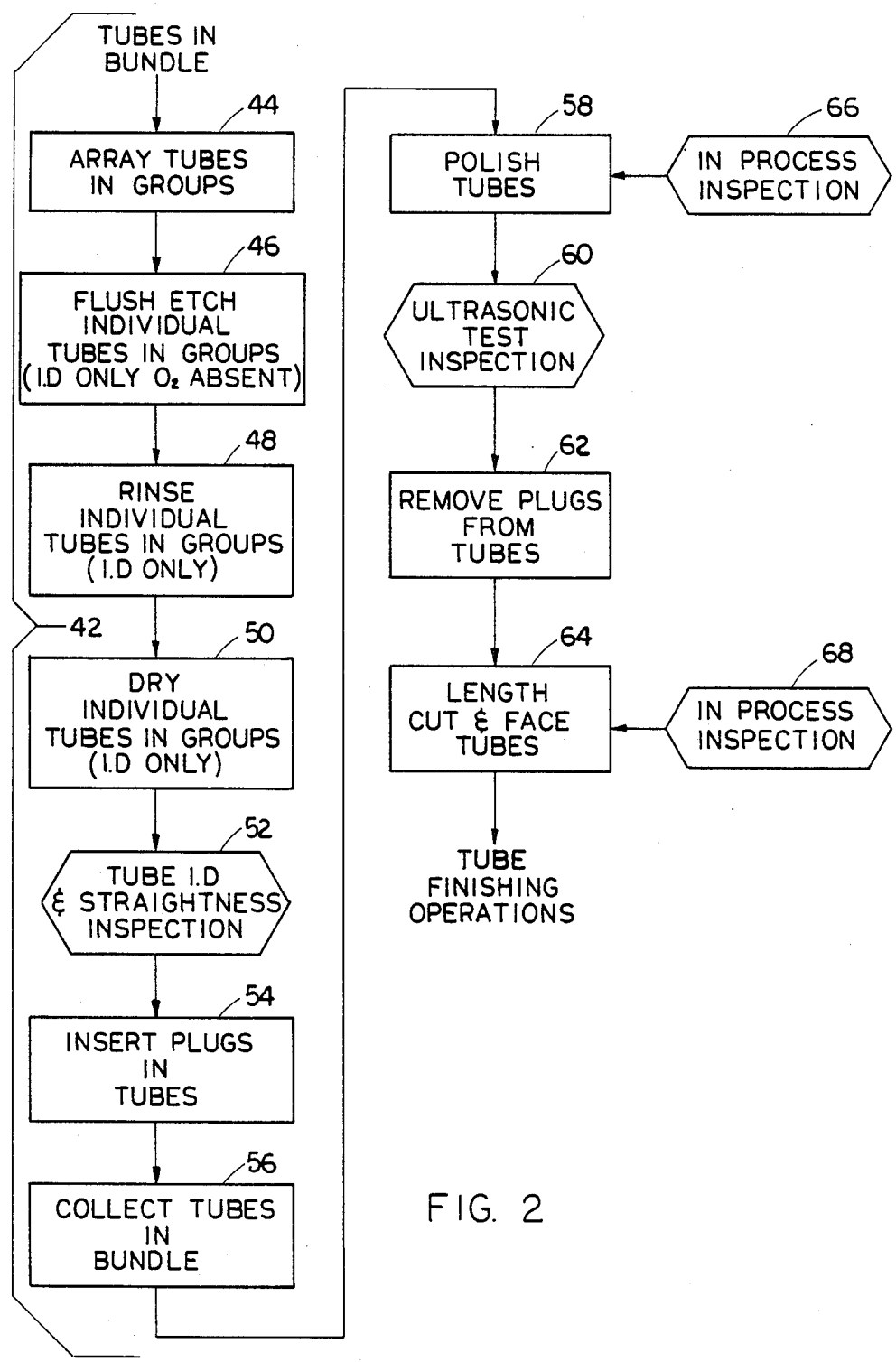
FIG. 2 is a block diagram of the sequence of steps including the tube processing subsystem of the present invention useful in a fuel rod tube manufacturing system.

Referring now to the drawings, and particularly to FIG. 2, there is illustrated a block diagram of a sequence of steps which include the fuel rod tube processing subsystem of the present invention, being generally designated by the numeral 42. Each of the steps of the subsystem 42 will be described in detail hereafter with reference to the equipment illustrated in somewhat simplified form in FIGS. 3 and 4. However, before proceeding into a detailed discussion of the equipment, a brief overview of the semi-automated subsystem 42 will be presented with reference to FIG. 2.

The tube processing subsystem 42 which comprises only a small segment of a fuel rod tube manufacturing system basically involves the successive steps of: arraying tubes, as per block 44, being dispensed one at a time from a bundle thereof, for instance containing six hundred tubes, into small groups of tube, for instance each containing fifteen tubes, deposited in side-by-side relationship; flush etching individual tubes in the groups thereof, as per block 46; rinsing individual tubes in the groups thereof, as per block 48; drying individual tubes in the groups thereof, as per block 50; inspecting the tubes one at a time, as per block 52; and plugging the tubes one at a time, as per block 54. The plugged tubes are then collected, as per block 56, and transported to another location where they are subjected to additional conditioning steps as follows: tube polishing, as per block 58; ultrasonic test inspection of the tubes, as per block 60; removal of the plugs from the tubes, as per block 62, and cutting to desired length, as per block 64. In-process inspections, as per blocks 66,68, accompany tube polishing and tube length cutting.

It will be observed that flush etching, rinsing and drying of the tubes is now carried out only with respect to the inside diameter surfaces of the tubes. Flush etching is performed in the absence of atmospheric oxygen which eliminates formation of fluoride deposits in the tubes. It will also be observed that the tube lengths are not trimmed or cut until after the ultrasonic test inspection. This allows the uninspected end portions of the tubes to be substantially those sections which will be cutoff when the tubes are trimmed to desired length.

Turning now to FIGS. 3 and 4, there is illustrated one example of a line of equipment making up the multi-staged tube processing subsystem 42. The equipment includes means in the form of an automatic tube feeder 70 for dispensing fuel rod tubes T at an inlet stage 72 one at a time from a bundle thereof numbering in the hundreds of such tubes. The bundle of tubes are transferred from an annealing operation (not shown) to the feeder 70 which then, in a controlled manner, releases the tubes one at a time onto a ramp 74.

Means in the form of a singulator 76 and an arrayer 78 are located at the downstream end of the ramp 74 for receiving the dispensed tubes T one at a time and arraying the tubes in a side-by-side relationship at an assembling stage 80 in a group thereof numbering in the fives of such tubes. In particular, the singulator 76 and arrayer 78 coact to sequentially position a maximum of fifteen tubes T side-by-side at equidistantly spaced intervals defined by a plurality of grooves 82 formed in a set of transversely aligned end trays 84 mounted on longitudinal frame members 86.

Once arrayed on the trays 84 at the assembling stage 80, means in the form of a walking beam conveyor, generally indicated as 88 and being located between the longitudinal frame members 86, is actuatable by an actuator 90 for elevating and advancing the group of tubes T downstream to successive processing stages of the subsystem 42. Specifically, the group of tubes T are first delivered to an etch and rinse stage 92, next to an open stage 94, then to a drier stage 96, and finally to a ramp 98 leading to an inspection stage 100. As long as sufficient tubes are present at the inlet stage 72 for being arrayed in groups at the assembling stage 80, the conveyor 88 when actuated will deliver the successively arrayed groups of tubes T simultaneously from the assembling stage 80 to the etch and rinse stage 92, from the etch and rinse stage 92 to the open stage 94, from the open stage 94 to the drier stage 96, and from the drier stage 96 to the inspection stage 100. Additionally sets of end trays 84 are located on the frame members 86 for positioning the groups of tubes T in the side-by-side spaced relationship at the respective stages 92–96 and upstream end 102 of the ramp 98 leading the inspection stage 100.

At the etch and rinse stage 92 and drier stage 96, pairs of manifolds 104 and 106 are located outwardly from the opposite ends of the groups of tubes T positioned on the respective sets of end trays 84. In preparation for flush etching and rinsing at stage 92 and drying at stage 96, the respective manifolds 104,106 are moved toward one another to close the opposite ends of the tubes. The manifolds 104 are then operated to flush etch and rinse the tubes T in the group such that only the interiors of the tubes are treated with acid. More specifically, acid and rinse solutions are supplied at separate times to the manifolds 104 so that they are operated as follows: first, to flush etch the interiors of the tubes from the same one ends toward the same opposite ends thereof; second, to rinse the interiors of the tubes from the same one ends toward the same opposite ends thereof; third, to flush etch the interiors of the tubes from the same opposite ends toward the same one ends thereof; and, fourth, to rinse the interiors of the tubes from the opposite ends toward the same one ends thereof. Hot air is supplied to the manifolds 106 to dry the interiors of the tubes positioned at the drier stage 96. Attention is directed to the patent application cross-referenced above for a more detailed understanding of the construction and operation of the manifolds 104,106. The disclosure of the cross-referenced application is incorporated herein by reference. Parenthetically, it should be mentioned here that the open multi stage 94 is provided in case conditions should arise where additional drying, rinsing or etching or any other processing step time is needed.

After leaving the drier stage 96 and arriving at the upstream end 102 of the ramp 98, the dried tubes are released from the conveyor 88 and roll down the ramp 98 to the inspection stage 100. At this stage, the interiors of the tubes will be inspected to separate acceptable tubes from substandard ones. A number of different inspection techniques can be used, such as manual visual, fiber optics, etc. An inspection revealing unacceptable flaws will trigger a "reject" gate 108 which will open and allow the rejected tube to fall into a holding area 110.

Acceptable tubes will pass over the closed gate 108 and via a ramp 112 roll to a tube plugging stage 114. At the stage 114, the opposite ends of the tubes are plugged to protect the inside and to prevent contaminants from entering the tube interior. Any one of a variety of conventional tube plugging techniques can be used. After plugging is completed on a tube, it is allowed to roll off the ramp 112 into transfer cart 116 where the tubes are recollected into a bundle.

It is thought that the present invention and many of its attendant advantages will be understood from the foregoing description and it will be apparent that various changes may be made in the form, construction and arrangement of the parts thereof without departing from the spirit and scope of the invention or sacrificing all of its material advantages, the form hereinbefore described being merely a preferred or exemplary embodiment thereof.

We claim:

1. In a fuel rod tube manufacturing system, a tube processing subsystem comprising:
   (a) means for dispensing fuel rod tubes one at a time from a bundle thereof;
   (b) means for receiving the dispensed tubes one at a time and arraying the tubes in a side-by-side relationship in a group thereof containing less tubes than the bundle thereof;
   (c) means for receiving a group of arrayed tubes and flush etching and rinsing the same, said etching and rinsing means being operable (i) initially to seal the interiors of the tubes from the atmosphere, (ii) then without changing the positions of the tubes to, first, flush etch the interiors of the tubes in one direction from the same one ends toward the same opposite ends thereof, second, rinse the interiors of the tubes from the same one ends toward the same opposite ends thereof, third, flush etch the interiors of the tubes in the opposite direction from the same opposite ends toward the same one ends thereof, and, fourth, rinse the interiors of the tubes from the opposite ends toward the same one ends thereof, and (iii) finally to unseal the interiors of the tubes;

(d) means for receiving a group of flush etched and rinsed tubes and drying the same; and (e) means for receiving a group of dried tubes to inspect the same to separate those tubes which are accepted from those which are rejected.

2. The subsystem as recited in claim 1, further comprising:

(f) means for delivering successive groups of tubes simultaneously from said arraying means to said flush etching and rinsing means, from said flush etching and rinsing means to said drying means, and from said drying means to said inspecting means.

3. The subsystem as recited in claim 1, further comprising:

(f) means for receiving accepted inspected tubes one at a time to plug the same to seal the interiors of the tubes.

4. The subsystem as recited in claim 3, further comprising:

(g) means for conveying the accepted inspected tubes one at a time from said inspecting means to said plugging means.

5. In a fuel rod tube manufacturing system, a tube processing subsystem comprising:

(a) means for dispensing fuel rod tubes at an inlet stage one at a time from a bundle thereof numbering in the hundreds of such tubes;

(b) means for receiving the dispensed tubes one at a time from the inlet stage and arraying the tubes in a side-by-side relationship at an assembling stage into a group thereof numbering in the fives of such tubes;

(c) means for receiving a group of arrayed tubes at an etch and rinse stage and flush etching and rinsing the tubes, said etching and rinsing means being operable (i) initially to seal the interiors of the tubes from the atmosphere, (ii) then without changing the positions of the tubes to, first, flush etch the interiors of the tubes in one direction from the same one ends toward the same opposite ends thereof, second, rinse the interiors of the tubes from the same one ends toward the same opposite ends thereof, third, flush etch the interiors of the tubes in the opposite direction from the same opposite ends toward the same one ends thereof, and, fourth, rinse the interiors of the tubes from the opposite ends toward the same one ends thereof, and (iii) finally to unseal the interiors of the tubes;

(d) means for receiving a group of flush etched and rinsed tubes at a drier stage and drying the tubes;

(e) means for receiving a group of dried tubes at an inspection stage to inspect the tubes to separate those of the inspected tubes which are accepted from those which are rejected;

(f) means for receiving the accepted inspected tubes one at a time at a plug stage to plug the tubes to seal the interiors of the tubes;

(g) means for delivering successive groups of tubes simultaneously from said assembling stage to said etch and rinse stage, from said etch and rinse stage to said drier stage, and from said drier stage to said inspection stage; and (h) means for conveying the accepted inspected tubes one at a time from said inspection stage to said plug stage.

6. In a fuel rod manufacturing system, a tube processing method comprising the steps of:

(a) dispensing fuel rod tubes one at a time from a bundle thereof numbering in the hundreds of such tubes;

(b) receiving the dispensed tubes one at a time and arraying the tubes in a side? by? side relationship in a group thereof numbering in the fives of such tubes;

(c) receiving a group of arrayed tubes and flush etching and rinsing the same, said etching and rinsing including (i) initially sealing the interiors of the tubes from the atmosphere, (ii) then without changing the positions of the tubes, first, flush etching the interiors of the tubes in one direction from the same one ends toward the same opposite ends thereof, second, rinsing the interiors of the tubes from the same one ends toward the same opposite ends thereof, third, flush etching the interiors of the tubes in the opposite direction from the same opposite ends toward the same one ends thereof, and, fourth, rinsing the interiors of the tubes from the opposite ends toward the same one ends thereof, and (iii) finally unsealing the interiors of the tubes;

(d) receiving a group of etched and rinsed tubes and drying the same;

(e) receiving a group of dried tubes and inspecting the same;

(f) separating those of the inspected tubes which are accepted from those which are rejected; and (g) receiving accepted inspected tubes one at a time and plugging the same to seal the interiors of the tubes.

7. The method as recited in claim 6, further comprising the step of:

(h) delivering successive groups of tubes simultaneously from the location of said arraying of the group of tubes to the location of said flush etching and rinsing thereof, from the location of said flush etching and rinsing of the group of tubes to said location of said drying thereof, and from the location of said drying of the group of tubes to the location of said inspecting thereof.

8. The method as recited in claim 6, further comprising the step of:

(h) conveying the accepted inspected tubes one at a time from the location of said inspecting to the location of said plugging.

9. In a fuel rod tube manufacturing system, a tube processing method comprising the steps of:

(a) dispensing fuel rod tubes at an inlet stage one at a time from a bundle thereof numbering in the hundreds of such tubes;

(b) receiving the dispensed tubes one at a time from the inlet stage and arraying the tubes in a side? by? side relationship at an assembling stage into a group thereof numbering in the fives of such tubes;

(c) receiving a group of arrayed tubes at an etch and rinse stage and flush etching and rinsing the tubes, said etching and rinsing including (i) initially sealing the interiors of the tubes from the atmosphere, (ii) then without changing the positions of the tubes, first, flush etching the interiors of the tubes in one direction from the same one ends toward the same opposite ends thereof, second, rinsing the interiors of the tubes from the same one ends toward the same opposite ends thereof, third, flush etching the interiors of the tubes in the opposite direction from the same opposite ends toward the same one ends thereof, and, fourth, rinsing the interiors of the tubes from the opposite ends toward the same one ends thereof, and (iii) finally unsealing the interiors of the tubes;

(d) receiving a group of flush etched and rinsed tubes at a drier stage and drying the tubes;

(e) receiving a group of dried tubes at an inspection stage and inspecting the tubes;

(f) separating those of the inspected tubes which are accepted from those which are rejected;

(g) receiving the accepted inspected tubes one at a time at a plug stage and plugging the tubes to seal the interiors of the tubes;

(h) delivering successive groups of tubes simultaneously from said assembling stage to said etch and rinse stage, from said etch and rinse stage to said drier stage, and from said drier stage to said inspection stage; and (i) conveying the accepted inspected tubes one at a time from the inspection stage to the plug stage.

* * * * *